United States Patent [19]
Cain et al.

[11] 4,043,617
[45] Aug. 23, 1977

[54] SELF-ALIGNING BEARING AND ROD END ASSEMBLY INCLUDING FORMED BALL MOUNT

[75] Inventors: Earl S. Cain, Portola Valley; Jerome A. Carlson, Woodside; George E. Goodrich, San Carlos, all of Calif.

[73] Assignee: Tribotech, Redwood City, Calif.

[21] Appl. No.: 669,345

[22] Filed: Mar. 22, 1976

[51] Int. Cl.² .............................................. F16C 23/04
[52] U.S. Cl. ...................................................... 308/72
[58] Field of Search ........................ 308/72, 237 R, 15

[56] References Cited
U.S. PATENT DOCUMENTS

| | | | |
|---|---|---|---|
| 2,794,691 | 6/1957 | Noe | 308/72 |
| 3,395,436 | 8/1968 | Sullivan | 308/72 X |
| 3,550,232 | 12/1970 | Burnett | 308/72 X |
| 3,754,802 | 8/1973 | Keller | 308/72 |
| 3,759,589 | 9/1973 | Rozentals | 308/72 |

Primary Examiner—Joseph F. Peters, Jr.
Assistant Examiner—Gene A. Church

[57] ABSTRACT

Self-aligning bearing and rod end assembly including a formed race serving to accommodate the internal alignable load bearing.

4 Claims, 10 Drawing Figures

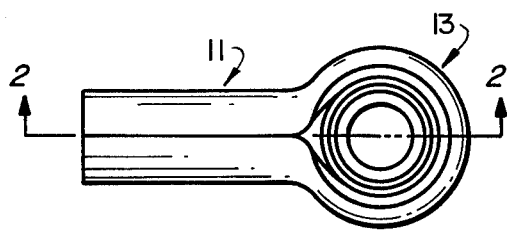
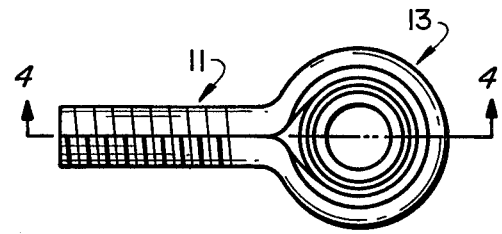
FIG_1          FIG_3
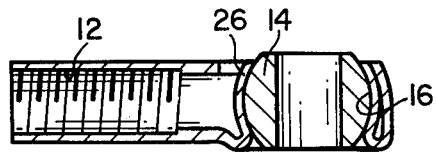
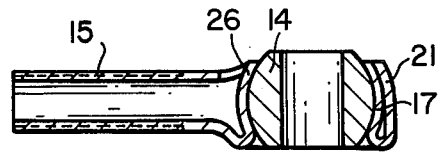
FIG_2          FIG_4
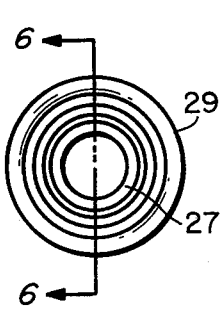 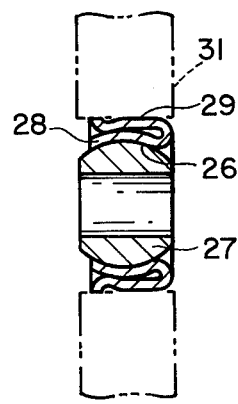 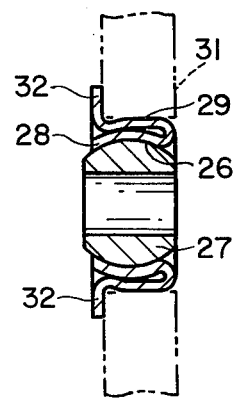
FIG_5   FIG_6   FIG_7

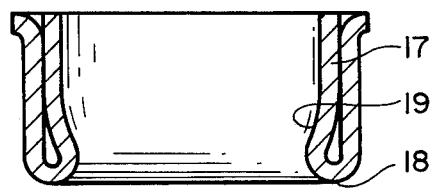
FIG_8a
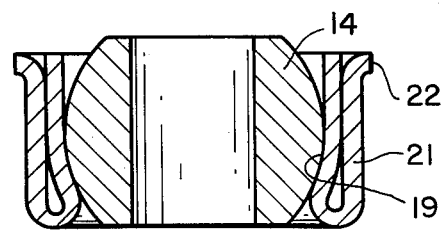
FIG_8b
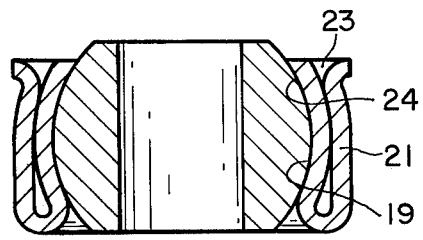
FIG_8c
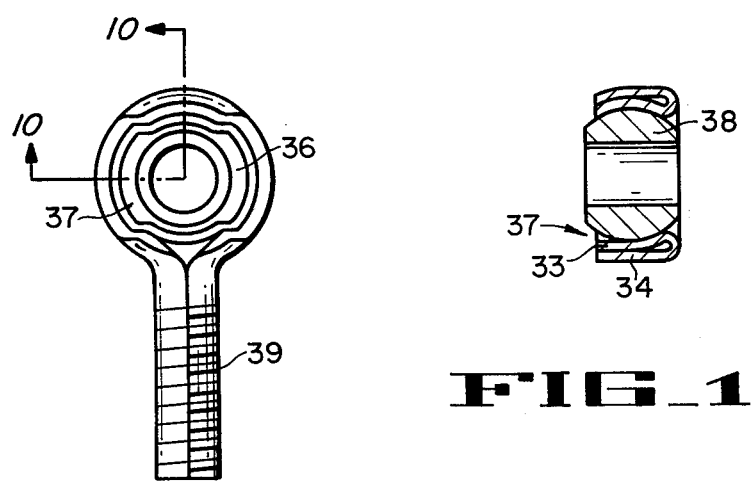
FIG_9
FIG_10

SELF-ALIGNING BEARING AND ROD END ASSEMBLY INCLUDING FORMED BALL MOUNT

REFERENCE TO RELATED APPLICATIONS

In our copending application entitled "Bearing Mount", Ser. No. 492,214, filed July 26, 1974, there is described and claimed a one-piece metal bearing mount which can serve as a flange, pillow block or take-up mount for self-aligning bearings; in our copending application entitled "Flange Mount", Ser. No. 664,164 filed Mar. 5, 1976, there is described a one-piece formed metal flange mount; and in our copending application entitled "Pillow Block", Ser. No. 644,163, filed Mar. 5, 1976, there is described a one-piece formed metal pillow block,

BACKGROUND OF THE INVENTION

This invention relates generally to self-aligning bearings and rod end assemblies and more particularly to self-aligning bearings and rod end assemblies which include a formed one-piece race for mounting the internal alignable bearing.

Present designs of self-aligning bearings and rod end assemblies are generally of two types: those which include a one-piece machined race, and those which include a one or two-piece pressed steel race. One-piece machined types are relatively expensive to process and machine. The pressed steel types are generally inexpensive and primarily intended for light duty and are not for large radial loads.

OBJECTS AND SUMMARY OF THE INVENTION

It is a general object of the present invention to provide strong, economical, self-aligning bearings and rod end assemblies which include a formed race accommodating the internal alignable bearing.

It is another object of the present invention to provide self-aligning bearings and rod end assemblies which have high radial and thrust load capacity.

It is a further object of the present invention to provide a rod end assembly in which there is included a formed spherical race accommodating a spherical bearing ball.

It is another object of the present invention to provide a self-aligning bearing which includes a formed spherical race accommodating a spherical bearing ball.

The foregoing objects of the invention are achieved by a spherical bearing or rod end assembly including a formed spherical ball race with a spherical bearing ball mounted therein.

BRIEF DESCRIPTION OF THE DRAWINGS

FIG. 1 is an elevational view of a rod end assembly including threaded female support.

FIG. 2 is a sectional view of the rod end assembly of FIG. 1 taken along the line 2—2.

FIG. 3 is an elevational view of the rod end assembly mount including a threaded male support.

FIG. 4 is a sectional view of the rod end assembly of FIG. 3 taken along the line 4—4.

FIG. 5 is an elevational view of a spherical bearing.

FIG. 6 is a view taken along the line 6—6 of FIG. 5 showing one embodiment of a spherical bearing mounted within a support shown in dotted outline.

FIG. 7 is a sectional view of another embodiment of a spherical bearing mounted within a support shown in dotted outline.

FIGS. 8a through 8c show another method of accommodating the ball in the spherical race.

FIG. 9 is an elevational view of a rod end which includes mounting slots for mounting the bearing ball in the formed race.

DESCRIPTION OF PREFERRED EMBODIMENTS

Referring to the figures which show rod end and spherical bearings in accordance with the invention, it is seen that the ball races are formed of a single-sheet metal piece as, for example, by multi-stage forming in a press with appropriate dies. It will also be apparent to one skilled in the art that the races can be formed by forging, bending, welding or other methods of forming metal.

Referring now to FIGS. 1 and 2, there is shown a rod end assembly which includes a mounting stem 11 having internal threads 12 with a ball mounting end 13 serving to mount spherical ball 14 in race 16 for rotational and pivotal movement within the mount. The ball mount 13 as well as the stem 11 are formed from a single sheet or piece of metal. A ball mount is shown more clearly in FIG. 8a. The mount includes a cylindrical flange 17 extending from one face. The flange has a spherical configuration 19 at one end of a cylindrical configuration whereby the ball 14 can be accommodated in the flange to seat against the spherical portion 19, FIG. 8b. The outer portions of the metal sheet or plate are bent as shown at 21 to surround and engage the flange 17. This provides additional strength to the ball mount. After the ball is inserted, FIG. 8b, the ends 22 of the two flanges are bent inwardly as shown at 23 to form another portion of a sphere 24 which surrounds and holds the ball 14 as shown more clearly in FIG. 2. The resulting configuration is a spherical race for the ball. Referring to FIGS. 1 and 2, the other end of the sheet or plate is bent in abutting end cylindrical configuration to form the stem 11 and internally threaded. The edges of the stem adjacent the seam engage the adjacent portion of the flange 17 as shown at 26.

The rod end assembly of FIGS. 3 and 4 is of identical construction; however, it includes male threads 15 on the stem portion 11.

In certain applications it is desirable to form spherical bearings including a ball mounted in a suitable race. Referring specifically to FIGS. 5, 6 and 7, there is shown a spherical bearing which includes an inner spherical race 26 which serves to accommodate a ball 27. The cylindrical bearing may be formed by first forming an interior flange 28 which eventually forms race 26 and an external support flange 29. The ball mount including flanges and race is formed as previously described with reference to FIG. 8. The difference between the cylindrical bearing of FIGS. 6 and 7 is the end portion of the outer supporting flange. In the case of FIG. 6 it extends within the opening of the associated support 31, while in the other figure it includes an extending portion 32 which engages the face of the support 3.

In FIGS. 9 and 10 there is shown a rod end assembly which includes slots initially for mounting the ball or for replacement into the race after the forming is completed. The inner flange 33 and outer flange 34 are formed with slot portions 36 and 37 through which the ball is inserted with its axis at right angles to the axis of the ball 38. The ball is then rotated and seats in the race as shown in FIG. 10. As shown, the stem 39 is externally threaded. If a spherical bearing is desired, the bearing shown in FIGS. 5 through 7 is provided with the mounting slots and the ball inserted in the manner just described.

What is claimed is:

1. A self-aligning rod end bearing assembly including a bearing receiving flange extending outwardly from one face of a plate and adapted to receive and hold a bearing therein, outer portions of said plate serving to stiffen said flange, a bearing race formed in the inner surface of said flange, a bearing disposed in said race for movement therein, means for holding said bearing in said flange in cooperation with the race and a stem formed from the same plate as the bearing receiving flange for securing and self-aligning rod end bearing to an associated rod.

2. A self-aligning rod end bearing assembly as in claim 1 wherein the outer portions of said plate are bent in the same direction as said flange and engage and support the flange.

3. A self-aligning bearing assembly as in claim 1 in which said means for holding the bearing in cooperation with the race comprises the ends of said flange.

4. A self-aligning bearing assembly as in claim 1 in which said flange includes bearing mounting slots.

* * * * *